United States Patent
Dehm

(10) Patent No.: US 11,745,620 B2
(45) Date of Patent: Sep. 5, 2023

(54) MOTOR VEHICLE AND METHOD FOR CHARGING AN ELECTRIC TRACTION ENERGY STORAGE OF A MOTOR VEHICLE

(71) Applicant: Audi AG, Ingolstadt (DE)

(72) Inventor: Martin Dehm, Monheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 17/321,307

(22) Filed: May 14, 2021

(65) Prior Publication Data
US 2021/0354590 A1    Nov. 18, 2021

(30) Foreign Application Priority Data

May 15, 2020 (DE) .......................... 102020113207.7

(51) Int. Cl.
*B60L 58/20* (2019.01)
*B60L 53/10* (2019.01)
*B60L 5/42* (2006.01)
*B60L 53/22* (2019.01)

(52) U.S. Cl.
CPC .................. *B60L 58/20* (2019.02); *B60L 5/42* (2013.01); *B60L 53/11* (2019.02); *B60L 53/22* (2019.02); *B60L 2210/10* (2013.01)

(58) Field of Classification Search
CPC .. B60L 58/20; B60L 5/42; B60L 53/11; B60L 53/22; B60L 2210/10; B60L 53/14; B60L 53/20; B60L 50/60; B60L 53/35; Y02T 10/72; Y02T 10/70; Y02T 10/7072; Y02T 90/12; Y02T 90/14
USPC .......................................................... 320/140
See application file for complete search history.

(56) References Cited

U.S. PATENT DOCUMENTS

2010/0133029 A1* 6/2010 Moran .............. H01M 8/04089
                                                       180/65.265
2016/0236580 A1* 8/2016 Hou ........................ B60L 58/20

FOREIGN PATENT DOCUMENTS

DE   102009028977 A1   3/2011
DE   102018116486 A1   1/2020

\* cited by examiner

*Primary Examiner* — Paul Dinh
(74) *Attorney, Agent, or Firm* — Seed IP Law Group LLP

(57) ABSTRACT

A motor vehicle includes an electric traction energy storage, at least two DC voltage converters, and a contact device for electrically contacting a vehicle-external energy source. The at least two DC voltage converters are each connected in series at a first side. The contact device is connected to the first sides of the DC voltage converters. The traction energy storage is connected to second sides of the DC voltage converters.

12 Claims, 1 Drawing Sheet

MOTOR VEHICLE AND METHOD FOR CHARGING AN ELECTRIC TRACTION ENERGY STORAGE OF A MOTOR VEHICLE

BACKGROUND

Technical Field

The disclosure relates to a motor vehicle comprising an electric traction energy storage, at least two DC voltage converters, and a contact device for the electric contacting of a vehicle-external energy source. Furthermore, the disclosure relates to a method for charging an electric traction energy storage of a motor vehicle.

Description of the Related Art

Vehicle-external energy sources may be used to provide a direct current during charging processes for the charging of a traction energy storage of a motor vehicle. The direct current can be taken up from the motor vehicle and used to charge a traction energy storage. In cases where the voltage level of a battery of the motor vehicle corresponds to the voltage produced by the charging station, the battery can be charged directly via the charging station. This may be the case, for example, with a MHEV (Mild-Hybrid Electric Vehicle). In other cases, a converter designed to charge the traction energy storage is generally provided in the motor vehicle, which adapts the voltage level of a direct current being taken up. However, this has the drawback that the additional converter requires design space in the motor vehicle and the technical expense as well as the production costs for the motor vehicle are increased.

BRIEF SUMMARY

The problem which the disclosure proposes to solve is to indicate a motor vehicle in which a traction energy storage of the motor vehicle can be charged with less expense.

To solve this problem, it is proposed according to the disclosure that, in a motor vehicle of the kind mentioned above, the at least two DC voltage converters are each connected in series at a first side and the contact device is connected to the first sides of the DC voltage converters, while the traction energy storage is connected to the second sides of the DC voltage converters.

The advantage of using two DC voltage converters (DC/DC converters), each being connected in series at a first side, is that it becomes possible to expand the first DC voltage converter of the motor vehicle, which is present in any case, so that it can also be used for the charging of the electric traction energy storage. The second DC voltage converter connected to the first DC voltage converter in series at their respective first side can undertake an adapting to the voltage of the direct current of a vehicle-external energy source as well as boost the maximum charging power for the charging of the traction energy storage. This advantageously allows the traction energy storage of the motor vehicle to be charged with a voltage provided by the vehicle-external energy source which is larger than the input voltage of the first DC voltage converter at its first side. Specifically, it is possible to charge the traction energy storage with a voltage provided by the vehicle-external energy source which corresponds to the sum of the respective input voltages on the respective first side of the DC voltage converters. This holds analogously when more than two, such as three or more DC voltage converters are used, being connected in series respectively at a first side. Thanks to the use of an already present DC voltage converter for the charging of the traction energy storage, the additional DC voltage converters can be designed with less structural size and/or boosted power, and thus also with lower costs.

The DC voltage converters are adapted to convert a DC voltage present at the first side into a DC voltage present at the second side, being different from the DC voltage present at the first side. In terms of an energy flow during a charging process, the first side of a DC voltage converter represents the input and the second side is accordingly the output. In particular, the DC voltage conversion can increase a DC voltage taken up via the contact device from a vehicle-external energy source to a voltage level of the traction energy storage of the motor vehicle, which might constitute for example a high-voltage battery. For example, the traction energy storage may have a voltage between 220 V and 840 V, for example between 220 V and 460 V or between 560 V and 840 V.

The charging through the two DC voltage converters can be used with special advantage when the electric traction energy storage is to be charged from a vehicle-external energy source whose voltage is less than the voltage of the traction energy storage. Furthermore, it becomes possible for the voltage provided by the vehicle-external energy source to be different from other voltages used internally in the motor vehicle, since one or more partial onboard networks, especially onboard low-voltage networks, can be connected respectively across one of the at least two DC voltage converters to the traction energy storage. This makes it possible for the voltage of the at least one partial onboard network to be different from the voltage of the electric traction energy storage and from the voltage taken up across the contact device from the vehicle-external energy source.

According to the disclosure, it may be provided that the DC voltage converters are connected in parallel at their respective second side. Thus, a current provided for the charging of the traction energy storage can be made larger in DC voltage converters which respectively generate at their second side a DC voltage corresponding to the voltage of the traction energy storage.

In one preferred embodiment of the disclosure, it may be provided that at least one of the DC voltage converters is operable bidirectionally. This makes it possible, besides charging the electric traction energy storage across the at least two DC voltage converters, to also operate at least one DC voltage converter with a reversed power flow, so that for example power from the electric traction energy storage, being connected to the second sides of the DC voltage converters, can be delivered across the at least one bidirectional DC voltage converter to a partial onboard network which is connected at the first side of the bidirectionally designed DC voltage converter.

According to the disclosure, it may be provided that at least one of the DC voltage converters is designed for a voltage at the first side corresponding to the voltage of an onboard low-voltage network of the motor vehicle. In particular, this DC voltage converter can be operable bidirectionally, so that it is also possible for the onboard low-voltage network of the motor vehicle to be operated from the electric traction energy storage. The voltage of the onboard low-voltage network can be 12 V in particular. However, other onboard network voltages are also possible, such as 24 V, 36 V or 48 V. These onboard network voltages are in particular categories of onboard network voltage corresponding to a normal voltage of the onboard network. In actual operation, the voltage in the onboard network may differ from the rated voltage, for example depending on a battery charge condition or the like. The DC voltage converter designed for conversion to a voltage of an onboard low-voltage network of the motor vehicle may be adapted in particular for a power between 1 kW and 5 kW, preferably 3 kW.

According to the disclosure, it may be provided that the onboard low-voltage network is connected to the first side of at least one of the DC voltage converters. This advantageously allows the DC voltage converter which is provided for powering the onboard low-voltage network to also be used for charging an electric traction energy storage.

According to the disclosure, it may be provided that the onboard low-voltage network is connected to a terminal corresponding to high potential of a first one of the DC voltage converters and to a terminal corresponding to low potential of a second one of the DC voltage converters. In particular, the terminal of the second DC voltage converter carrying the low potential can be connected to the terminal of the first DC voltage converter carrying the high potential by the series circuit of the DC voltage converters. It may be advantageous to take up a higher voltage by the series circuit of at least two DC voltage converters at the first side across the contact device than is used in the onboard low-voltage network of the motor vehicle.

Due to the interconnection such that the onboard low-voltage network is connected to a terminal of the first DC voltage converter corresponding to a high potential and a terminal of the second of the DC voltage converters corresponding to a low potential, the onboard low-voltage network is supplied with a voltage which corresponds to the voltage at the first side of the first DC voltage converter. For example, two DC voltage converters can be used, each being adapted to convert a voltage of the traction energy storage corresponding to the voltage in the onboard low-voltage network. This advantageously allows the two DC voltage converters to have the same design, so that the number of different parts of the motor vehicle can be reduced, having advantageous effect on the manufacturing costs and the manufacturing expense of the motor vehicle.

According to the disclosure, it may be provided that the contact device is designed for connection to an energy source providing a safety extra-low voltage. For this, the contact device may comprise at least one contact pair connected to a corresponding contact pair of the vehicle-external energy source. Open contacts can be used in an energy source providing a safety extra-low voltage, such as a DC voltage less than 60V, since a protection against electric shock even in the case of open contacts is provided by the use of a voltage equal to or less than the limit value of a safety extra-low voltage.

According to the disclosure, it may be provided that a switching device, especially at least one semiconductor switch and/or at least one contactor, is arranged between the contact device and the DC voltage converters. This switching device can produce a separation of the traction energy storage from the contact device. In this way, for example, it is possible to connect the contact device in power-free manner to the energy source at the vehicle side. The switching device may be used in addition or alternatively for a disconnecting of the contact device by a disconnecting of at least one of the DC voltage converters.

According to the disclosure, it may be provided that the contact device and/or the DC voltage converters are designed for continuous conducting of currents with 100 A. In this way, a charging with a relatively high charging power becomes possible, resulting from the product of the voltage provided by the vehicle-external energy source and the current taken up across the contact device. For further boosting of the charging power, it may be provided in particular that the contact device and/or the DC voltage converters are designed to carry currents with 200 A, 250 A, 300 A, 350 A, 400 A or 500 A. In particular, the contact device and/or the DC voltage converters are designed for a continuous carrying of these currents, and therefore the contact device and/or the DC voltage converters have a continuous capability, so that the charging power which is produced is also provided over a lengthy period of time and can be used for charging the electric traction energy storage.

In one preferred embodiment of the disclosure, it may be provided that the contact device comprises a movable current collector, wherein the current collector is designed for contacting a contact arrangement of the energy source. This makes it possible for the contact device to move the movable current collector of the contact device into direct contact with one or more contacts of the contact arrangement of the energy source, for example after parking the motor vehicle on top of the contact arrangement, so that energy in the form of a direct current can be taken up from the energy source and conducted across the DC voltage converters of the motor vehicle to the electric traction energy storage and/or to a low-voltage battery of an onboard low-voltage network connected to one of the DC voltage converters. In particular, the current collector can be arranged on the underside of the motor vehicle and be movable by an actuator, such as an electric motor, in the vertical direction.

According to the disclosure, it may be provided that the motor vehicle comprises a communication device for communication with the vehicle-external energy source. Through the communication device it is possible to transmit information, for example, that which is used for moving a movable current collector and/or for operating a switching device arranged between the contact device and the DC voltage converters. Furthermore, information can be transmitted regarding a power which is to be carried and/or a voltage to be provided from the vehicle-external energy source and/or a current to be provided from the vehicle-external energy source. For example, the communication device at the motor vehicle can be used to send voltage information describing the sum of the voltages at the first sides of the DC voltage converters to the vehicle-external charging station, so that a direct current with the proper voltage can be provided from the vehicle-external energy source.

In a method according to the disclosure for charging an electric traction energy storage of a motor vehicle, it is proposed that a current is taken up from a vehicle-external energy source across a contact device of the motor vehicle, the current being converted by at least two DC voltage converters connected in series at a respective first side connected to the contact device for feeding to the traction energy storage connected to the second sides of the DC voltage converters.

For example, a control unit of the motor vehicle which is designed to carry out the method can adjust the operation of the DC voltage converters, before or after the contacting of the vehicle-external energy source by the contact device of the motor vehicle, so that the current taken up across the contact device of the motor vehicle is converted by the first side of the DC voltage converters, which is connected to the contact device, into a higher voltage for the charging of the electric traction energy storage, situated at the second sides of the DC voltage converters, and a power flow will occur from the first sides of the DC voltage converters to the second sides of the DC voltage converters.

Thus, a power flow takes place from the contact device to the electric traction energy storage. Conversely, in a condition in which the electric traction energy storage is not being charged across the contact device, at least one of the DC voltage converters can be operated such that a power flow occurs from the traction energy storage, which is connected at the second side of the DC voltage converter, to an onboard low-voltage network connected at the first side of at least one of the DC voltage converters. Thanks to the connection of the onboard low-voltage network to the contact device at the first side of one of the DC voltage converters, it is also possible, in addition or alternatively to the charging of the traction energy storage, to feed energy taken up across the contact device into a low-voltage battery of the onboard low-voltage network. It is also possible for the vehicle-external energy source to be bidirectionally operable, so that energy can be surrendered from the traction energy storage to the vehicle-external energy source in a reverse power flow from the motor vehicle.

All of the advantages and embodiments described above in reference to the motor vehicle according to the disclosure also hold accordingly for the method according to the disclosure.

BRIEF DESCRIPTION OF THE SEVERAL VIEWS OF THE DRAWINGS

Further benefits and details of the disclosure will emerge from the following described exemplary embodiments and also with the aid of the drawings. These are schematic representations which show.

DETAILED DESCRIPTION

Figure 1:
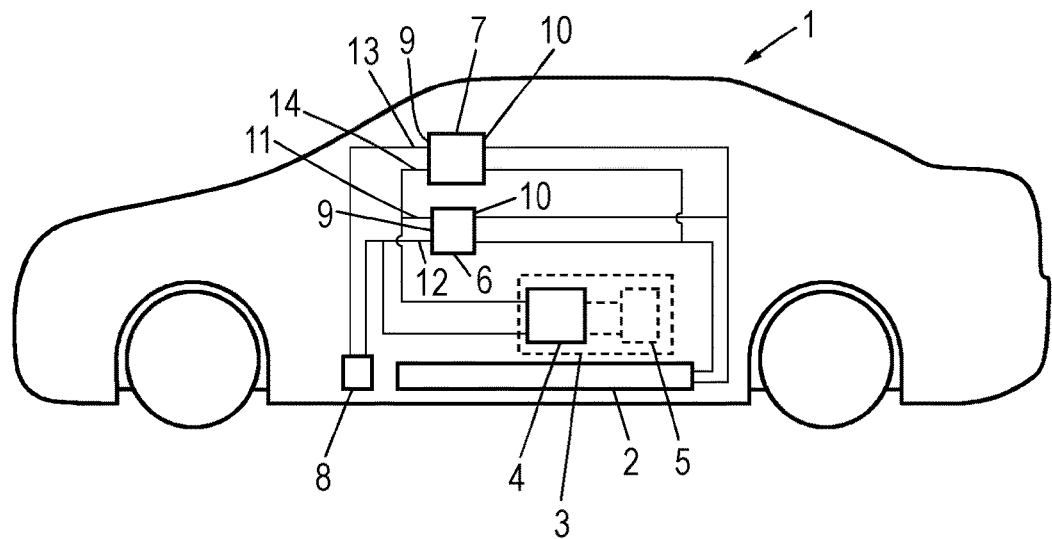
FIG. 1 shows an exemplary embodiment of a motor vehicle according to the disclosure.

FIG. 1 shows a schematic side view of a motor vehicle 1 according to the disclosure. The motor vehicle 1 comprises an electric traction energy storage 2, which contains energy for the operation of an electric traction motor (not shown here) of the motor vehicle 1. The traction energy storage 2 is designed as a high-voltage battery. Furthermore, the motor vehicle comprises an onboard low-voltage network 3, which comprises a low-voltage battery 4 as well as one or more consumers 5 (shown here by broken lines).

The motor vehicle 1 furthermore comprises a first DC voltage converter 6 and a second DC voltage converter 7. Moreover, the motor vehicle 1 comprises a contact device 8 for contacting a vehicle-external energy source. The first DC voltage converter 6 and the second DC voltage converter 7 are connected in series at their respective first sides 9 and connected by their second sides 10 to the electric traction energy storage 2. The DC voltage converters 6, 7 are connected in parallel to their second sides 10.

The first DC voltage converter 6 has a terminal 11 corresponding to a high potential at its first side 9 and a terminal 12 corresponding to a low potential. Accordingly, the other DC voltage converter 7 has a terminal 13 corresponding to a high potential at its first side 9 and a terminal 14 corresponding to a low potential. For the series connection of the DC voltage converters 6, 7, the terminal 14 of the DC voltage converter 7 is connected to the terminal 11 of the DC voltage converter 6. For the connecting of the onboard low-voltage network 3 to the DC voltage converter 6, for example, the low-voltage battery 4 of the onboard low-voltage network 3 is connected to the terminal 14 of the DC voltage converter 7 corresponding to a low potential or to the terminal 11 of the DC voltage converter 6 corresponding to a high potential. In addition, the low-voltage battery 4 or the onboard low-voltage network 3 is also connected to the terminal 12 of the first DC voltage converter 6 corresponding to a low potential.

The contact device 8 adapted to taking up a direct current is connected to the terminal 12 of the DC voltage converter 6 corresponding to a low potential and to the terminal 13 of the other DC voltage converter 7 corresponding to a high potential.

Figure 2:
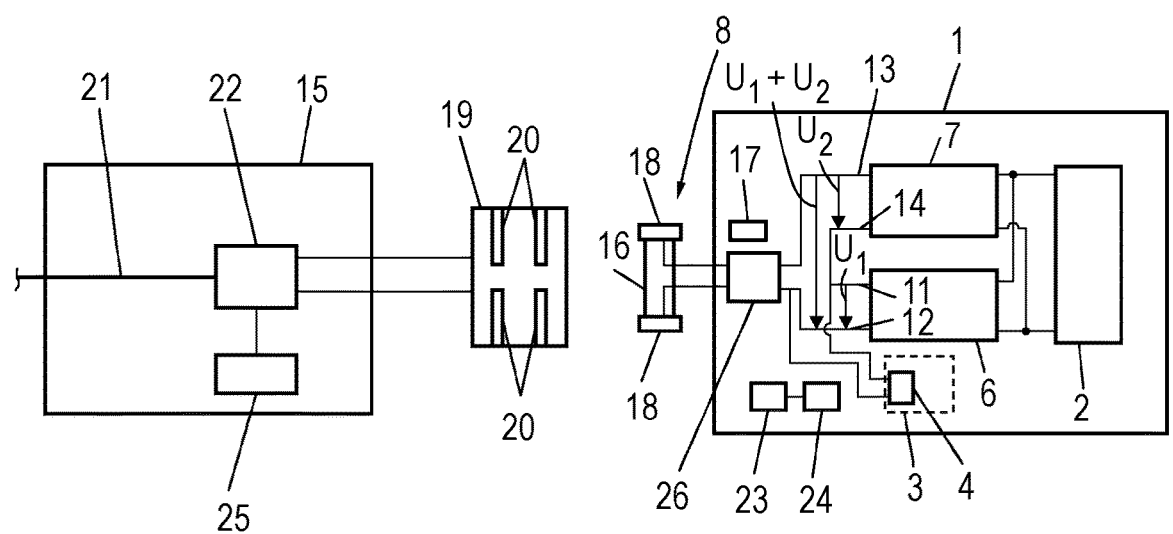
FIG. 2 shows the motor vehicle according to the disclosure and a vehicle-external energy source.

FIG. 2 shows a view of the motor vehicle 1 as well as a vehicle-external energy source designed as a charging station 15. The contact device 8 of the motor vehicle 1 comprises a current collector 16, which is movable by an actuator 17, such as an electric motor. The current collector 16 comprises two contacts 18, which are designed for connection to a contact arrangement 19 of the charging station 15. The contact arrangement 19 of the charging station 15 comprises two contact pairs 20, each designed for contacting with one of the contacts 18 of the current collector 16.

For the charging of the traction energy storage 2 of the motor vehicle 1, the motor vehicle 1 may be moved on top of the contact arrangement 19 of the charging station 15 and the current collector 16 of the contact device 8 can be moved by the actuator 17 on top of the contact arrangement 19, so that the contacts 18 respectively come into direct contact with one of the contact pairs 20. After this, energy can be delivered via the charging station 15 to the motor vehicle 1. For this, the charging station 15 may have, for example, a single or multiple-phase alternating current terminal 21, which is connected to a rectifier 22. Thanks to the rectifier 22, a single or multiple-phase alternating current can be rectified and transformed into a direct current having a voltage equal to or less than a limit value for a safety extra-low voltage.

The direct current provided by the charging station 15 as a vehicle-external energy source can be taken up for the charging of the traction energy storage 2 by the current collector 16 of the contact device 8. In the present exemplary embodiment, the first of the DC voltage converters 6 is designed to transform a voltage U1, applied between the terminals 11 and 12 on the first side 9 of the DC voltage converter 6, into a voltage corresponding to the voltage of the traction energy storage 2. Accordingly, the second of the DC voltage converters 7 is designed to transform a voltage U2, applied between the terminals 13 and 14 on the first side 9 of the DC voltage converter 7, into a voltage corresponding to the voltage of the traction energy storage 2. The voltage U1 of the first DC voltage converter 6 corresponds to the voltage of the onboard low-voltage network 3 or the voltage of the low-voltage battery 4 of the onboard low-voltage network 3.

The voltage taken up across the contact device 8 corresponds in this case to the sum of the input voltages of the DC voltage converters 6, 7, and therefore to the voltage U1+U2. The use of the second DC voltage converter 7 advantageously allows the first DC voltage converter 6 provided for the connection of the onboard low-voltage network 3 to the traction energy storage 2 in the motor vehicle 1 to also be used for the charging of the traction energy storage 2 across the contact device 8. This enables the taking up of a voltage U1+U2 which is larger than the voltage U1 on the first side 9 of the DC voltage converter 6. Thus, thanks to the use of the second DC voltage converter 7, a charging can be done with a voltage provided by the vehicle-external energy source which is larger than the voltage on the first side 9 of the DC voltage converter 6 or larger than the voltage of the onboard low-voltage network 3 of the motor vehicle 1. This advantageously enables an increasing of the charging power or a reduction of the flowing current strength for a given charging power.

For example, it is possible to generate a voltage of 24 V from the charging station 15, where the first of the DC voltage converters 6 has an input voltage U1=12 V and the second of the DC voltage converters 7 likewise has an input voltage of U2=12 V. Hence, the voltage of the onboard low-voltage network 3 is 12 V. It is possible, in particular, for the DC voltage converter 6 and the DC voltage converter 7 to have the identical design, so that the number of different parts and thus both the manufacturing costs and the manufacturing expense of the motor vehicle 1 can be reduced. However, it is also possible for the second DC voltage converter to have an input voltage U2>12 V, so that a voltage U1+U2>24 V can be provided from the charging station 15.

The first DC voltage converter 6 in particular may have a bidirectional design, so that an operation of the onboard low-voltage network 3 from the traction energy storage 2 is also possible. The first DC voltage converter 6 may be designed for example with a capacity of 3 kW or 3.6 kW. Given an identical design of the second DC voltage converter 7 corresponding to the first DC voltage converter 6, a maximum charging power of 6 kW or 7.2 kW thus becomes possible. As mentioned above, it is possible to employ the second DC voltage converter 7 with an input voltage U2 which is larger than the input voltage U1 of the first DC voltage converter 6. In such variant embodiments, in particular, the second DC voltage converter 7 may also have a higher power than the first DC voltage converter 6, so that on the whole even larger charging powers become possible for the charging of the electric traction energy storage 2. It is also possible for the charging station 15 to be bidirectionally operable, so that energy may also be delivered from the motor vehicle 1 in a reverse power flow from the traction energy storage 2 to the charging station 15.

The motor vehicle 1 furthermore comprises a communication device 23 as well as a control unit 24. For the exchange of information, at least some information can be exchanged via a communication link between the communication device 23 of the motor vehicle 1 and a communication device 25 of the charging station 15. This may involve, for example, a voltage of a direct current to be provided from the charging station 15 at the contact arrangement 19, so that the charging process of the traction energy storage 2 in the motor vehicle 1 can take place through the DC voltage converters 6, 7. A switching device 26 of the motor vehicle 1 can be provided for the disconnecting of the contact device 8, comprising at least one semiconductor switch and/or at least one contactor. The switching device 26 can be used to switch both the high potential and the low potential or a ground potential which is taken up across the contact device 8. Alternatively, it is also possible for the switching device to be used only for switching the positive potential which is connected to the terminal 13 of the DC voltage converter 7. The switching device 26 may be designed as a separate component or be integrated in the DC voltage converter 7, the rectifier 7 possibly having additional terminals for an input and an output of a switched low potential or a switched ground potential.

The control unit 24 of the motor vehicle 1 is designed to carry out a method for charging of the electric traction energy storage 2 of the motor vehicle 1. In the charging process, the contact device 8 of the motor vehicle 1 is used to take up a direct current from the charging station 11, the direct current being converted by the DC voltage converters 6, 7 connected in series at their first side 9 for feeding the traction energy storage 2. For this, the control unit 24 may actuate the switching device 26 for the opening or closing of at least one switch element of the switching device 7. Furthermore, the control unit 24 can adjust the operation of the DC voltage converter 6 and the DC voltage converter 7 so that an energy flow is possible from the contact device 8 to the traction energy storage 2. After the ending of the charging process, the control unit 12 can also actuate the DC voltage converter 6 such that an energy flow is possible from the traction energy storage 2 to the onboard low-voltage network 3, for example to the low-voltage battery 4 of the onboard low-voltage network 3.

The contact device 8 and the DC voltage converters 6, 7 are designed to carry, in particular continuously, currents with 100 A, preferably currents with 200 A, 250 A, 300 A, 350 A, 400 A or 500 A. Currents with a lesser current strength can also be carried. The maximum current strength which can be carried by the contact device 8 and by the motor vehicle 1 can depend in particular on the maximum power of the DC voltage converters 6, 7.

Patent Application No. 102020113207.7, filed in Germany on May 15, 2020, to which this application claims priority, is hereby incorporated herein by reference, in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A motor vehicle, comprising:
an electric traction energy storage;
a first Direct Current (DC) voltage converter having a first side and a second side;
a second DC voltage converter having a first side and a second side; and
a contact device configured to electrically connect to a vehicle-external energy source, wherein the first sides of the first and second DC voltage converters are electrically connected outside of the first and second DC voltage converters in series, the contact device is electrically connected outside of the first and second DC voltage converters to the first sides of the first and second DC voltage converters, and the traction energy storage is electrically connected to the second sides of the DC voltage converters.

2. The motor vehicle according to claim 1, wherein the second sides of the first and second DC voltage converters are connected in parallel.

3. The motor vehicle according to claim 1, wherein at least one of the first and second DC voltage converters is operable bidirectionally.

4. The motor vehicle according to claim 1, further comprising an onboard low-voltage network, wherein at least one of the first and second DC voltage converters is designed for a voltage at the first side corresponding to the voltage of the onboard low-voltage network.

5. The motor vehicle according to claim 4, wherein the onboard low-voltage network is connected to the first side of at least one of the first and second DC voltage converters.

6. The motor vehicle according to claim 5, wherein the onboard low-voltage network is connected to a terminal corresponding to a high potential of the first DC voltage converter and to a terminal corresponding to a low potential of the second DC voltage converter.

7. The motor vehicle according to claim 1, wherein the contact device is designed for connection to an energy source providing a safety extra-low voltage.

8. The motor vehicle according to claim 1, further comprising a switching device arranged between the contact device and the first and second DC voltage converters and including at least one of a semiconductor switch and a contactor.

9. The motor vehicle according to claim 1, wherein at least one of the contact device and the first and second DC voltage converters are designed for continuous conducting of currents greater than or equal to 100 A.

10. The motor vehicle according to claim 1, wherein the contact device includes a movable current collector, wherein the current collector is designed for contacting a contact arrangement of the energy source.

11. The motor vehicle according to claim 1, wherein the motor vehicle includes a communication device for communicating with the vehicle-external energy source.

12. A method for charging an electric traction energy storage of a motor vehicle, the method comprising:
- receiving a current from a vehicle-external energy source across a contact device of the motor vehicle;
- converting the current by at least two Direct Current (DC) voltage converters electrically connected outside of the first and second DC voltage converters in series at respective first sides electrically connected outside of the first and second DC voltage converters to the contact device; and
- feeding energy from the contact device to a traction energy storage connected to second sides of the DC voltage converters.

* * * * *